(12) United States Patent
Tamada

(10) Patent No.: US 12,449,081 B2
(45) Date of Patent: Oct. 21, 2025

(54) BORING MACHINE

(71) Applicant: COSMO KOKI CO., LTD., Tokyo (JP)

(72) Inventor: Satoshi Tamada, Tokyo (JP)

(73) Assignee: COSMO KOKI CO., LTD., Tokyo (JP)

( * ) Notice: Subject to any disclaimer, the term of this patent is extended or adjusted under 35 U.S.C. 154(b) by 0 days.

(21) Appl. No.: 17/766,512

(22) PCT Filed: Sep. 24, 2021

(86) PCT No.: PCT/JP2021/035129
§ 371 (c)(1),
(2) Date: Apr. 4, 2022

(87) PCT Pub. No.: WO2023/047543
PCT Pub. Date: Mar. 30, 2023

(65) Prior Publication Data
US 2024/0052961 A1    Feb. 15, 2024

(51) Int. Cl.
*F16L 41/04*    (2006.01)
*B26F 1/16*    (2006.01)
*F16L 47/34*    (2006.01)

(52) U.S. Cl.
CPC ............. *F16L 41/04* (2013.01); *B26F 1/16* (2013.01); *F16L 47/34* (2013.01)

(58) Field of Classification Search
CPC . F16L 41/04; F16L 47/34; F16L 41/06; F16L 41/02; F16L 41/08; F16L 41/18; B26F 1/16
See application file for complete search history.

(56) References Cited

U.S. PATENT DOCUMENTS

| 1,353,833 A | * | 9/1920 | Haley | ............ F16L 41/06 |
| | | | | 74/841 |
| RE26,447 E | * | 8/1968 | McMurray | ...... F16L 41/06 |
| | | | | 29/890.11 |

(Continued)

FOREIGN PATENT DOCUMENTS

| CN | 102489742 | 6/2012 | |
| JP | 2001-353477 | 12/2001 | ........... B08B 9/04 |

(Continued)

OTHER PUBLICATIONS

International Search Report and Written Opinion issued in PCT/JP2021/035129, dated Nov. 22, 2021 (9 pgs).

(Continued)

*Primary Examiner* — Daphne M Barry
(74) *Attorney, Agent, or Firm* — HAYES SOLOWAY P.C.

(57) ABSTRACT

A boring machine for boring a part of a fluid pipe in an uninterrupted flow state, includes: a shaft member having a leading end to which a cutter is attached; a drive mechanism configured to rotate the cutter and the shaft member around the shaft of the shaft member; and a forward and backward moving operation mechanism configured to move the cutter and the shaft member forward and backward in the axial direction of the shaft member by a handle that is manually rotated. The forward and backward moving operation mechanism is further configured to switch a feed amount of the cutter and the shaft member in the axial direction between at least two different feed amounts according to a rotational amount of the handle.

5 Claims, 8 Drawing Sheets

(56) References Cited

U.S. PATENT DOCUMENTS

| | | | | |
|---|---|---|---|---|
| 5,620,020 A * | 4/1997 | Collins | ................ | F16L 55/105 |
| | | | | 83/745 |
| 6,615,859 B2 * | 9/2003 | Sato | ................ | F16L 41/06 |
| | | | | 408/1 R |
| 6,640,827 B1 * | 11/2003 | McClure | ................ | F16L 41/06 |
| | | | | 408/67 |
| 6,776,184 B1 * | 8/2004 | Maichel | ................ | F16L 55/105 |
| | | | | 251/327 |
| 6,902,201 B1 * | 6/2005 | Helle | ................ | F16L 47/345 |
| | | | | 137/317 |
| 7,159,603 B2 * | 1/2007 | King | ................ | F16L 41/04 |
| | | | | 408/67 |
| 7,722,298 B2 * | 5/2010 | Russell | ................ | F16L 41/06 |
| | | | | 408/101 |
| 8,528,186 B2 * | 9/2013 | Crawford | ................ | F16L 41/082 |
| | | | | 29/523 |
| 8,899,254 B1 * | 12/2014 | Weiler | ................ | F16L 41/06 |
| | | | | 81/53.2 |
| 10,563,804 B2 * | 2/2020 | Yoneda | ................ | F16L 41/06 |
| 2001/0017159 A1 * | 8/2001 | Sato | ................ | F16L 41/04 |
| | | | | 137/318 |
| 2005/0081684 A1 | 4/2005 | Yang | ................ | B25G 3/02 |
| 2012/0192962 A1 * | 8/2012 | Asai | ................ | E03B 7/08 |
| | | | | 137/315.29 |

FOREIGN PATENT DOCUMENTS

| | | | | |
|---|---|---|---|---|
| JP | 2006-212764 | | 8/2006 | ............ B23B 45/06 |
| JP | 2013-59822 | | 4/2013 | ............ B23B 41/06 |
| JP | 2015-42894 | | 3/2015 | ............ F16L 41/06 |

OTHER PUBLICATIONS

Canadian Office Action issued in related Canadian Patent Application Serial No. 3,155,135, dated Jun. 9, 2023, 5 pages.

International Preliminary Report on Patentability issued in PCT/JP2021/035129, dated Mar. 26, 2024, 6 pages.

* cited by examiner

BORING MACHINE

TECHNICAL FIELD

The present invention relates to a boring machine for forming a through-hole into a fluid pipe.

BACKGROUND ART

In a fluid pipe constituting an existing pipe line through which water or gas flows, in order to form a new branched path, a part of the fluid pipe may be bored in an uninterrupted flow state by using a boring machine.

In the method for boring the fluid pipe in this manner, a branching housing, a process valve, and a boring machine are mainly used. Specifically, firstly, a coated portion of the branching housing is attached in a sealed manner to a pipe wall of the existing fluid pipe. Next, the process valve is attached in a sealed manner to a branch portion of the branching housing extended in a direction different to the pipe axis direction of the fluid pipe from the coated portion of the branching housing. Next, the boring machine is connected via an attachment flange to the process valve. Next, a cutter of the boring machine is forwardly moved toward the fluid pipe within the branch portion, and a part of the fluid pipe is cut by the cutter in a state that it is rotationally moved by a drive unit and then a through-hole is formed. Moreover, in association with the aforementioned boring by the boring machine, by appropriately opening and closing the process valve, it is possible to cut off a part of the fluid pipe in an uninterrupted flow state.

For example, as indicated in Patent Citation 1, a boring machine includes a connection flange, a shaft member, and a cutter. The connection flange is fixed in a sealed manner to an attachment flange to be attached to a branch portion of a branching housing. The shaft member is capable of moving forward and backward relative to the connection flange. The cutter is fixed to a leading end portion of the shaft member, and is capable of moving forward and backward relative to the connection flange along with the shaft member.

The forward and backward moving operation of the cutter and the shaft member is conducted by manually rotatably operating a handle which is attached to a forward and backward moving mechanism provided on an opposite end portion of the shaft member. Specifically, by manually rotatably operating the handle attached to the forward and backward moving mechanism, a screw shaft (not shown) inserted through the inside of the shaft member rotates. In an inner periphery of the shaft member, a female screw corresponding to the screw shaft is cut. By rotation of the screw shaft, the cutter and the shaft member move relative to each other in an axial direction of the screw shaft without rotation of them. In addition, the cutter and the shaft member are capable of rotationally moving by a drive unit (not shown) independently from the rotatable operation of the handle.

CITATION LIST

Patent Literature

Patent Citation 1: JP 2015-42894 A (Page 5, FIG. 3)

SUMMARY OF INVENTION

Technical Problem

As mentioned above, when forming a through-hole in a fluid pipe by the boring machine as in Patent Citation 1, in a state that the cutter and the shaft member are rotationally moved by the drive unit, the cutter and the shaft member are moved forward and backward by manually rotatably operating the handle attached to an operation portion, and the cutter is brought into contact with a peripheral wall portion of the fluid pipe and then a part of the peripheral wall portion of the fluid pipe is cut. That is, the forward and backward movement in the axial direction of the cutter and the shaft member depends on the rotatable operation of the handle. Moreover, in the boring machine as in Patent Citation 1, a process valve for cutting the fluid pipe in an uninterrupted flow state is attached thereto, and thereby the cutter attached to an outward side than the process valve is arranged to be largely spaced from the existing fluid pipe, and therefore, in order to move forward and backward the cutter within the branch portion in a short time, a feed amount of the cutter with respect to a given amount of rotatable operation of the handle is set to be large.

Meanwhile, in the boring machine as in Patent Citation 1, the contact condition of the cutter and the peripheral wall portion of the fluid pipe within the branch portion is sensuously grasped by taking a change in resistance force transmitted to a hand of an operator via the handle as a clue. Moreover, the contact condition of the cutter and the peripheral wall portion of the fluid pipe is changed depending on proceeding degree of the cutter, and for example, when the cutter starts to come into contact with the peripheral wall portion of a top portion of the fluid pipe, a contact region (relative to the resistance force transmitted to the hand of the operator) is small. Thereafter, the contact region (relative to the resistance force transmitted to the hand of the operator) becomes large as the cutter proceeds, the cutter passes through the peripheral wall portion of the fluid pipe over the entire circumference thereof and thereby the contact region (relative to the resistance force transmitted to the hand of the operator) becomes small. Therefore, in the boring machine as in Patent Citation 1, by manually fine-tuning the rotatable operation of the handle, it is difficult to properly control the proceeding speed of the cutter. If the proceeding speed of the cutter is too fast in a state that the cutter comes into contact with the peripheral wall portion of the fluid pipe, a friction force generated between the cutter and the fluid pipe is excessively increased, and wear and breakage of the cutter may occur.

The present invention has been made focusing on such a problem, and an object of the present invention is to provide a boring machine capable of easily controlling a proceeding speed of a cutter by manual rotatable operation of a handle.

Solution to Problem

In order to solve the problem described above, a boring machine according to the present invention is a boring machine for boring a part of a fluid pipe in an uninterrupted flow state, including: a shaft member having a leading end to which a cutter is attached; a drive means configured to rotate the cutter and the shaft member around an axis of the shaft member; and a forward and backward moving operation means configured to move the cutter and the shaft member forward and backward in an axial direction of the shaft member by a handle that is manually rotated, wherein the forward and backward moving operation means is further configured to switch a feed amount of the cutter and the shaft member in the axial direction between at least two different feed amounts according to a rotational amount of the handle. According to the aforesaid feature of the present invention, by switching the feed amount of the cutter and the shaft member in the axial direction according to the rotatable operation amount of the handle so as to become large, a proceeding speed of the cutter and the shaft member to approach to the existing fluid pipe can be made faster. Moreover, by switching the feed amount of the cutter and the shaft member in the axial direction according to the rotatable operation amount of the handle so as to become small, the proceeding speed of the cutter and the shaft member at the time of cutting a peripheral wall portion of the fluid pipe can be made slower. Therefore, it is possible to easily control the proceeding speed of the cutter by manual rotatable operation of the handle.

The cutter may include a center drill projecting in a forward moving direction of the cutter. According to this configuration, once the fact that the center drill comes into contact with the existing fluid pipe is grasped, the feed amount in the axial direction of the cutter and the shaft member can be switched so as to become small.

The center drill may include a recovery means which recovers a piece of a cut fluid pipe. According to this configuration, after cutting the existing fluid pipe, by switching the feed amount in the axial direction of the cutter and the shaft member by rotatable operation of the handle so as to become large, it is possible to recover the piece of the cut fluid pipe by the recovery means in a short time.

The forward and backward moving operation means may include at least a first input shaft and a second input shaft providing the feed amounts in the axial direction, respectively, and the feed amounts may be different from each other by one revolution of the handle are different with each other. According to this configuration, by rotatably operating the handle connected to the respective input shafts, it is possible to switch the feed amount in the axial direction of the cutter and the shaft member to anyone of the different feed amounts.

The handle may be attachable to and detachable from the first input shaft and the second input shaft. According to this configuration, one handle can be connected to a plurality of input shafts by being attached thereto and detached therefrom, and therefore the boring machine can be compactly configured. Besides, by detaching the handle from an unused input shaft, it is possible to avoid interference by rotational movement of the unused input shaft at the time of manual rotatable operation of the handle.

The boring machine may further include cover members surrounding outer peripheries of the first input shaft and the second input shaft over a circumferential direction, respectively. According to this configuration, since the respective input shafts are respectively surrounded by the cover members, at the time of rotatable operation of the handle, an accident due to contact with or roll in the unused input shaft to which the handle is not attached can be prevented.

DESCRIPTION OF EMBODIMENTS

Modes for carrying out a boring machine according to the present invention will be described below based on an embodiment of the present invention.

EMBODIMENT

In an embodiment of the present invention, a series of flows for cutting an existing fluid pipe 1 constituting a flow path component at a predetermined point in an uninterrupted flow state by a boring machine 5 will be described with reference to FIGS. 1 to 8.

Figure 1:
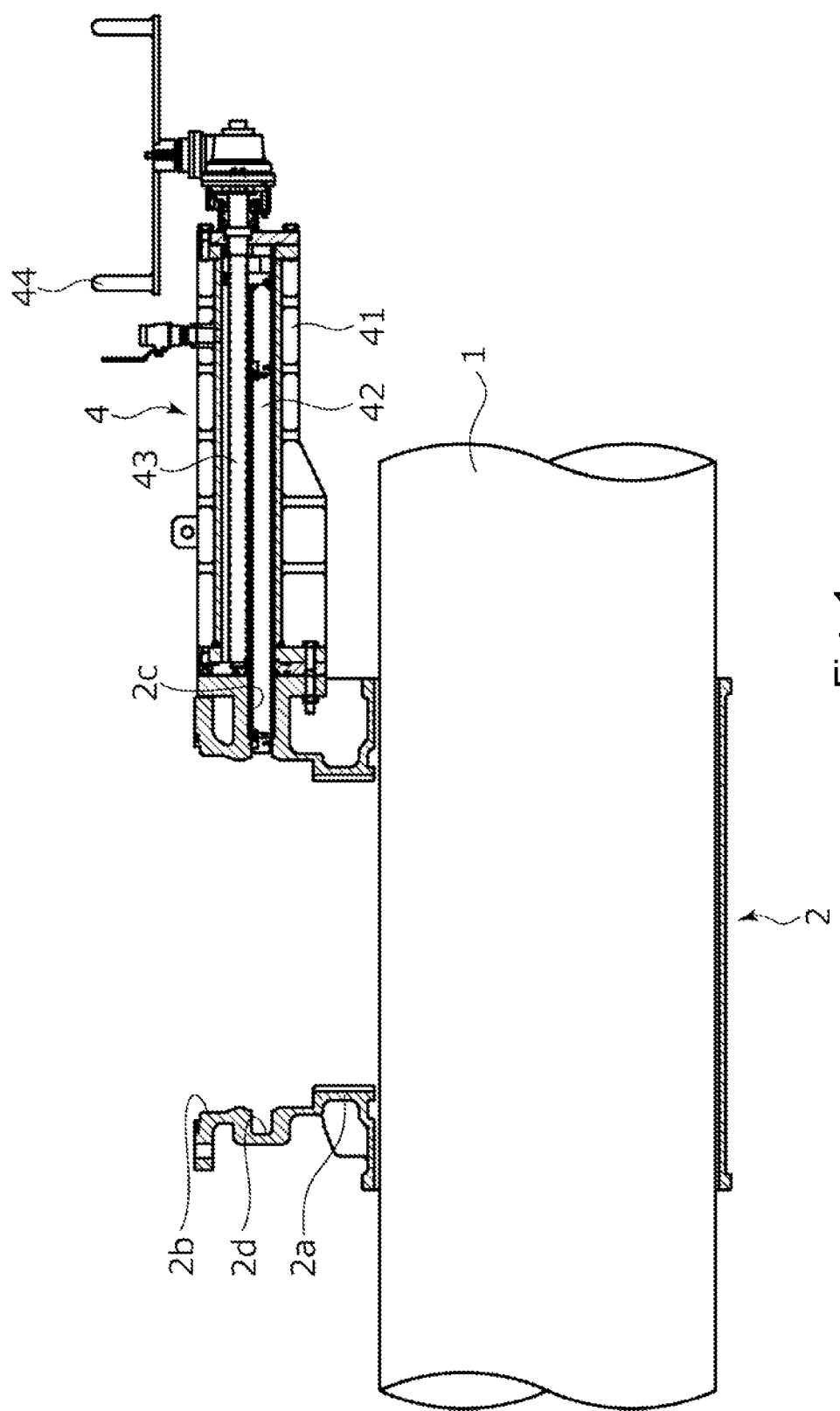
FIG. 1 is a sectional side view showing a state that a branching housing and a process valve are attached to a fluid pipe in an embodiment of the present invention.

As shown in FIG. 1, the circumference of the predetermined point of the fluid pipe 1 buried in the ground is excavated, and a two-divided structured branching housing 2 having a branch portion 2a opened upwardly surrounds it in a sealed manner. In addition, for example, fluid in the fluid pipe 1 may be gas, or gas-liquid mixture of gas and liquid, in addition to clean water, industrial water, or sewage water. Furthermore, the branching housing 2 has a two-divided structure in the present embodiment, but may have a three or more-divided structure. Moreover, divided housings may be joined together by welding or by means of a bolt via a packing.

The fluid pipe 1 is a ductile cast iron pipe, and is formed into a straight pipe having a substantially circular shape in a cross-sectional view. In addition, the fluid pipe according to the present invention may be made of metal such as other cast iron or steel, concrete, vinyl chloride, polyethylene, polyolefin, or the like. Moreover, an inner peripheral surface of the fluid pipe may be coated with an epoxy resin layer, mortar, plating, or the like, or an appropriate material may coat on the inner peripheral surface of the fluid pipe by powder coating.

Moreover, when the branching housing 2 is attached to the fluid pipe 1, a concrete foundation (not shown) is formed below the branching housing 2, supports the weight of the periphery of the branching housing 2, and prevents the fluid pipe 1 from bending or the like. In addition, as long as the weight of the branching housing 2 or the boring machine 5 described below can be supported, not only a concrete foundation, but also a jack or the like may be used.

Moreover, between a pipe wall of the fluid pipe 1 and the branching housing 2, a packing (not shown) is pressure-welded over the circumferential direction, and therefore it is possible to secure sealing performance between the fluid pipe 1 and the branching housing 2. In addition, the packing may be press-fitted into a concave groove provided on the side of the branching housing 2, or may be press-fitted into a concave groove provided on the side of the fluid pipe 1.

Moreover, in the branching housing 2, an open end portion 2b opened upwardly is formed at an upper end of the branch portion 2a.

Next, as shown in FIG. 1, a process valve 4 is fixed by a bolt and a nut to the branch portion 2a of the branching housing 2. The process valve 4 is capable of blocking the inside of the branch portion 2a. In addition, the branching housing 2 to which the process valve 4 is connected in advance may be attached to the fluid pipe 1, or the branching housing 2 may integrally include a process valve capable of blocking the inside of the branch portion 2a.

The process valve 4 is mainly composed of a valve lid 41, a valve body 42, and a valve rod 43.

The valve lid 41 is connected in a sealed manner to an opening portion 2c formed laterally of the branch portion 2a. The valve body 42 is accommodated in the valve lid 41, and is capable of sitting on a valve seat 2d formed on the inner periphery of the branch portion 2a. The valve rod 43 connects the valve body 42 to the valve lid 41 so as to be capable of moving forward and backward thereto.

Specifically, by rotatably operating a process valve handle 44 to positively rotate the valve rod 43, the process valve 4 moves forward the valve body 42 to the side of the branch portion 2a and seats it on the valve seat 2d, thereby capable of blocking the inside of the branching housing 2. Moreover, by rotatably operating the process valve handle 44 to reversely rotate the valve rod 43, the process valve 4 moves backward the valve body 42 to the side of the valve lid 41, thereby capable of opening the inside of the branching housing 2.

Figure 2:
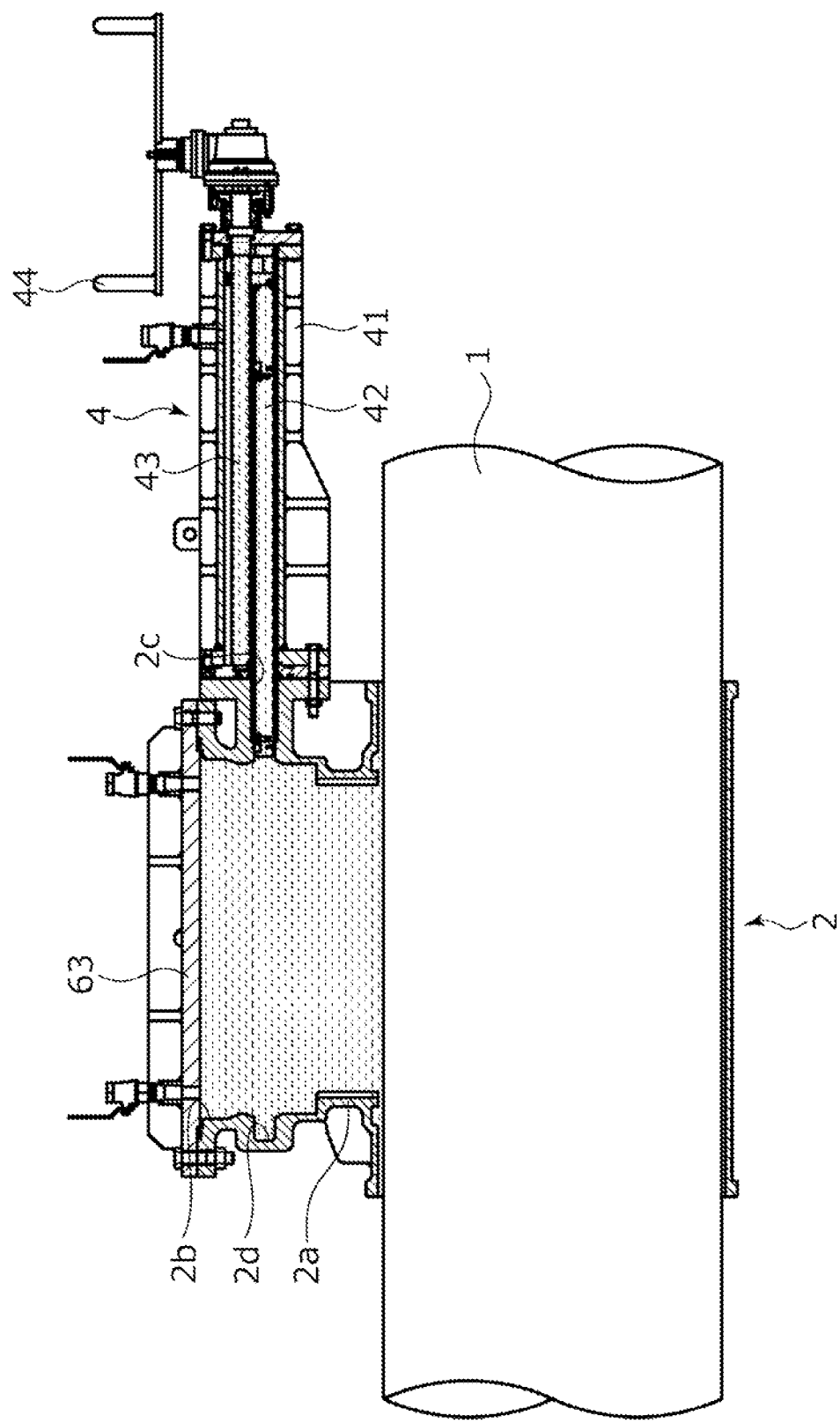
FIG. 2 is a sectional side view showing a state that a water pressure lid is attached to the branching housing.

Next, as shown in FIG. 2, a drain piping is connected to a drain port (not shown) of the branching housing 2, and the branching housing 2 and the process valve 4 are filled with water. Moreover, a water pressure lid 63 is fixed by a bolt and a nut above the open end portion 2b in the branch portion 2a of the branching housing 2. In this state, water is further poured into the branching housing 2 and the process valve 4, the pressure is increased to a predetermined pressure, and the presence or absence of water leakage is confirmed. After the completion of confirmation, the water pressure lid 63 is detached, and water within the branching housing 2 and the process valve 4 is drained through the drain piping. In addition, a drain hose and a chip recovery machine may be connected to the drain piping.

Figure 3:
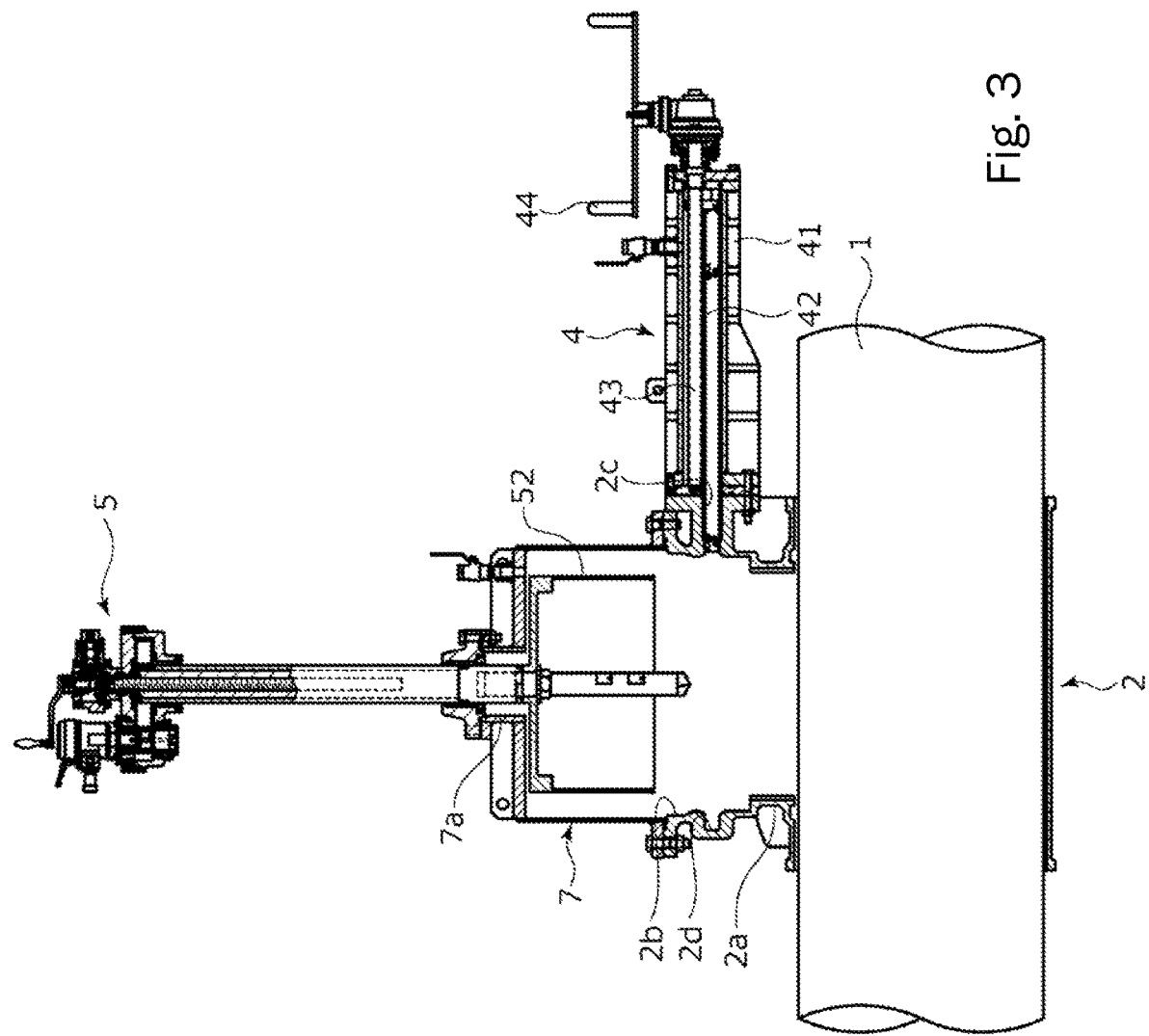
FIG. 3 is a sectional side view showing a state that a boring machine is attached to an opening portion of the branching housing.

Next, as shown in FIG. 3, the boring machine 5 is fixed by a bolt and a nut via an attachment flange cylinder 7 above the open end portion 2b in the branch portion 2a of the branching housing 2. The boring machine 5 is capable of cutting a part of a peripheral wall portion of the fluid pipe 1 within the branching housing 2 by a cutter 52 for boring in an uninterrupted flow.

Figure 4:
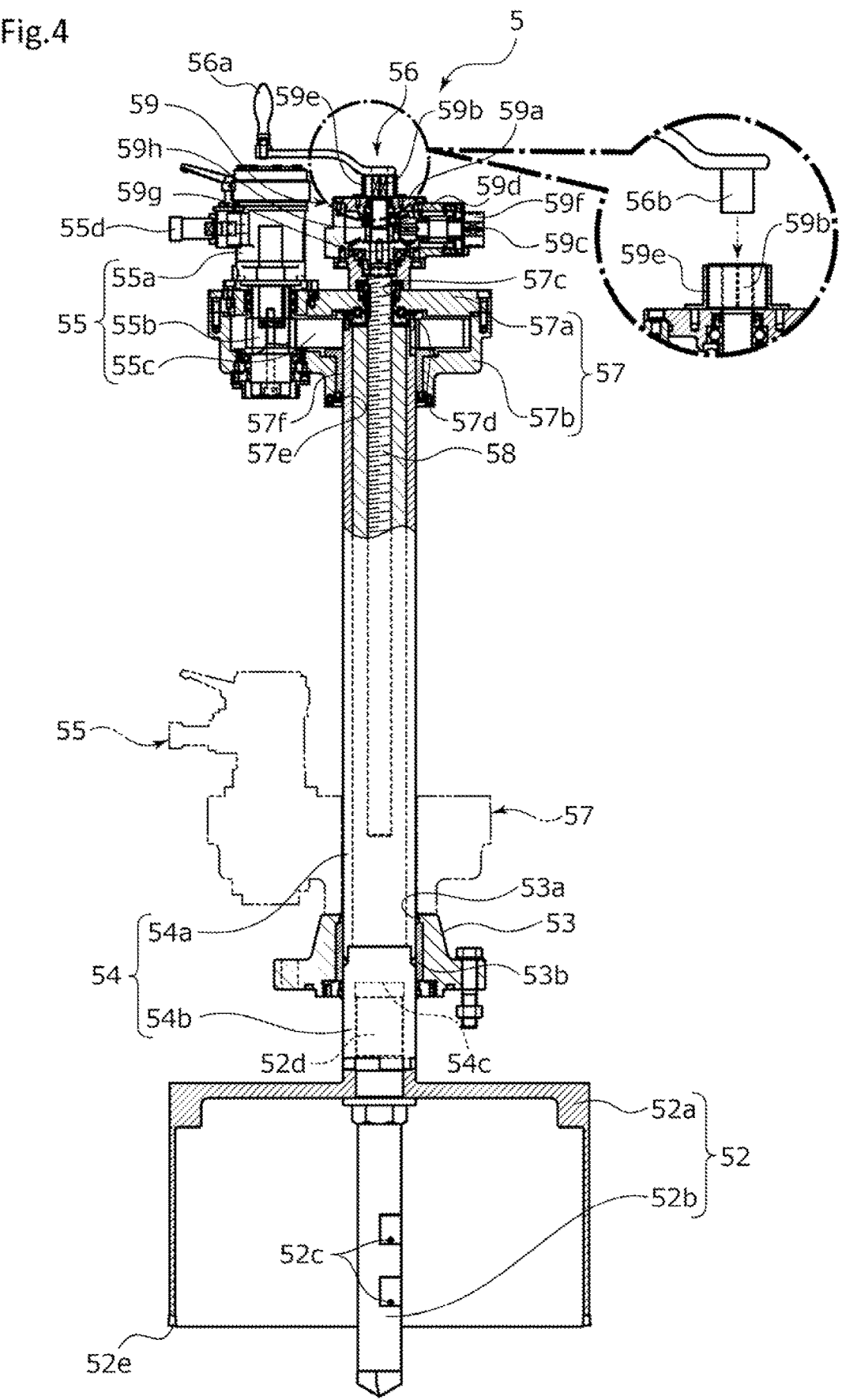
FIG. 4 is a sectional side view showing a structure of the boring machine.

As shown in FIG. 4, the boring machine 5 is mainly composed of the cutter 52, a connection flange 53, a shaft member 54, a drive mechanism 55 as a drive means, and a forward and backward moving mechanism 56 as a forward and backward moving operation means.

Figure 5:
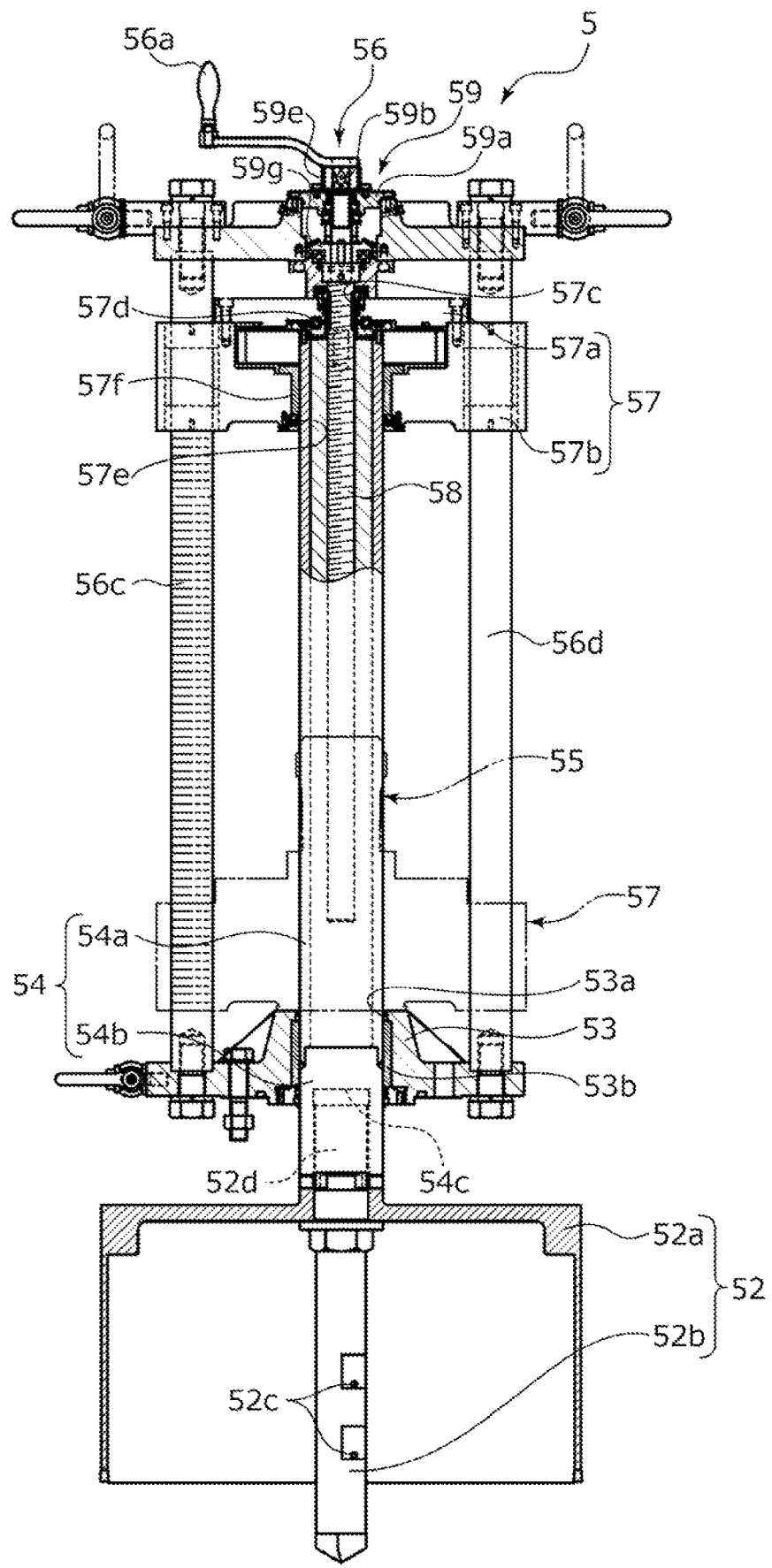
FIG. 5 is a front sectional view showing the structure of the boring machine.

As shown in FIGS. 4 and 5, the cutter 52 is mainly composed of a cylindrical member 52a and a center drill 52b.

The cylindrical member 52a is also referred to as a hole saw and includes a cutting blade 52e over the circumferential direction at a lower end, and the inside of the cylindrical member 52a is opened downward. The center drill 52b is arranged coaxially with the cylindrical member 52a, and projects downward from the cutting blade 52e, that is, in the moving forward direction of the cutter 52. Moreover, the cylindrical member 52a and the center drill 52b are fixed.

Moreover, in an intermediate portion of the center drill 52b, retainers 52c as recovery means are provided in two upper and lower positions. The retainer 52c is capable of expanding radially outward of the center drill 52b, and is capable of locking and retaining a piece 1a of the cut fluid pipe 1 (see FIG. 8).

To the upper part of the cutter 52, the shaft member 54 is attached so as not to rotate relatively.

As shown in FIGS. 4 and 5, the connection flange 53 is fixed by a bolt and a nut in a state of being placed above a cylindrical portion 7a (see FIG. 3) projecting upward in a central portion of the attachment flange cylinder 7.

Moreover, between the cylindrical portion 7a of the attachment flange cylinder 7 and the connection flange 53, a packing (not shown) is pressure-welded over the circumferential direction, and therefore it is possible to secure sealing performance between the attachment flange cylinder 7 and the connection flange 53. In addition, the packing may be press-fitted into a concave groove provided on the side of the connection flange 53, or may be press-fitted into a concave groove provided on the side of the attachment flange cylinder 7.

Moreover, in the connection flange 53, a through-hole 53a passing through the vertical direction is formed in the central portion, and the shaft member 54 is inserted through the through-hole 53a. Moreover, on the inner periphery of the through-hole 53a, a bearing 53b is provided, and the shaft member 54 inserted through the through-hole 53a is capable of smoothly moving forward and backward and capable of rotationally moving while keeping a sealed state with respect to the connection flange 53.

As shown in FIGS. 4 and 5, the shaft member 54 is mainly composed of a cylindrical portion 54a and an adapter 54b. The cylindrical portion 54a and the adapter 54b are fixed.

At a lower end of the adapter 54b, a concave portion 54c is formed so as to be concaved upward. In the concave portion 54c, a convex portion 52d projecting upward in the central portion of the cutter 52 is inserted.

As shown in FIG. 4, the drive mechanism 55 is mainly composed of a rotary motor 55a, a first gear 55b, and a second gear 55c. In addition, the first gear 55b and the second gear 55c are spur gears.

The rotary motor 55a is a hydraulic motor, and includes hydraulic oil inlet port 55d and outlet port (not shown). The rotary motor 55a transmits a rotational force to the shaft member 54 by hydraulic oil at a predetermined pressure and a predetermined flow rate to be supplied to the rotary motor 55a from a hydraulic unit (not shown). Specifically, in the rotary motor 55a, the first gear 55b is attached to a leading end of a drive shaft. The first gear 55b circumscribes the second gear 55c. The second gear 55c is fixed to an end portion of the cylindrical portion 54a in the shaft member 54.

In this manner, the drive mechanism 55 can rotate the shaft member 54 via the second gear 55c by imparting a rotational force to the first gear 55b by means of the rotary motor 55a. Further, the shaft member 54 rotates, thereby capable of rotating the cutter 52 together. In addition, the drive mechanism 55 transmits rotation to the shaft member 54 by the first gear 55b and the second gear 55c in the present embodiment, but other configuration may be possible as long as the drive mechanism can transmit rotation to the shaft member 54.

As shown in FIGS. 4 and 5, the forward and backward moving mechanism 56 is mainly composed of a forward and backward moving case 57, a screw shaft 58, an operation box 59, and a forward and backward moving operation handle 56a as a handle.

The forward and backward moving case 57 is mainly composed of a first divided case 57a and a second divided case 57*b*. The first divided case 57*a* and the second divided case 57*b* are integrally fixed by a bolt. Moreover, in the forward and backward moving case 57, a part of the rotary motor 55*a* and the first and the second gears 55*b* and 55*c* which constitute the drive mechanism 55 are accommodated.

In the first divided case 57*a*, a through-hole 57*c* passing through the vertical direction is formed in the central portion, and the screw shaft 58 is inserted through the through-hole 57*c*. Moreover, in an inner periphery of the through-hole 57*c*, a female screw corresponding to the screw shaft 58 is cut. That is, the screw shaft 58 inserted through the through-hole 57*c* rotates, and thereby the first divided case 57*a* is capable of moving forward and backward relative to the screw shaft 58 without rotation.

Further, between the first divided case 57*a* and an upper end of the shaft member 54, a bearing 57*d* is provided, and the shaft member 54 is capable of smoothly rotationally moving relative to the first divided case 57*a*.

In the second divided case 57*b*, a through-hole 57*e* passing through the vertical direction is formed in the central portion, and the screw shaft 58 and the shaft member 54 are inserted through the through-hole 57*e*. In addition, the screw shaft 58 is inserted through the central portion of the shaft member 54 from upper part. Moreover, on the inner periphery of the through-hole 57*e*, a bearing 57*f* is provided, and the shaft member 54 inserted through the through-hole 57*e* is capable of smoothly moving forward and backward and capable of rotationally moving relative to the second divided case 57*b*.

Moreover, as shown in FIG. 5, the forward and backward moving case 57 is slidably attached along a longitudinal direction of a pair of columns 56*c*, 56*d*. The columns 56*c*, 56*d* are fixed respectively by bolts at both ends of the longitudinal direction between the connection flange 53 and the operation box 59. In addition, on one column 56*c*, a scale is provided.

As shown in FIGS. 4 and 5, the operation box 59 is mainly composed of an operation case 59*a*, a first input shaft 59*b*, and a second input shaft 59*c*.

The operation case 59*a* is opened upward, and the first input shaft 59*b* projects upward from the opening. Moreover, the operation case 59*a* has a branch portion 59*d* opened laterally, and the second input shaft 59*c* projects laterally from the opening of the branch portion 59*d*. Further, in the operation case 59*a*, cover members 59*e*, 59*f* surrounding outer peripheries of the first input shaft 59*b* and the second input shaft 59*c* over the circumferential direction are provided respectively.

The first input shaft 59*b* is an upper end portion of the screw shaft 58 formed into a rectangular parallelepiped shape. That is, the forward and backward moving operation handle 56*a* is attached to the first input shaft 59*b* and is rotatably operated, thereby capable of rotating the screw shaft 58. In the present embodiment, the first input shaft 59*b* has an end surface which is concavely provided into a rectangular shape in a plan view. As shown in an area surrounded by a chain line of FIG. 4, to the first input shaft 59*b*, a leading end portion 56*b* which is convexly provided into a rectangular shape of the forward and backward moving operation handle 56*a* is fitted, thereby enabling rotatable operation.

As shown in FIG. 4, the second input shaft 59*c* is formed into a rectangular parallelepiped shape same as the first input shaft 59*b*. Moreover, in the second input shaft 59*c*, a second gear 59*h* is fixed to a leading end portion extending perpendicular to the first input shaft 59*b*.

The second gear 59*h* circumscribes a first gear 59*g* fixed to the screw shaft 58. In addition, the first gear 59*g* and the second gear 59*h* are bevel gears. That is, the forward and backward moving operation handle 56*a* is attached to the second input shaft 59*c* and is rotatably operated, thereby capable of rotating the screw shaft 58. The second input shaft 59*c* has an end surface which is concavely provided into a rectangular shape same as the shape of the first input shaft 59*b*. To the second input shaft 59*c*, the leading end portion 56*b* of the forward and backward moving operation handle 56*a* is fitted, thereby enabling rotatable operation.

Moreover, the number of teeth of the second gear 59*h* is less than the number of teeth of the first gear 59*g*. In the present embodiment, the number of teeth of the second gear 59*h* is half of the number of teeth of the first gear 59*g*. Thereby, the rotation of the screw shaft 58 in a case where the forward and backward moving operation handle 56*a* is attached to the second input shaft 59*c* and is rotated once is half of the rotation of the screw shaft 58 in a case where the forward and backward moving operation handle 56*a* is attached to the first input shaft 59*b* and is rotated once, that is, a rotation through 180 degrees. In other words, the feed amount in the axial direction of the cutter 52 and the shaft member 54 in a case where the forward and backward moving operation handle 56*a* is attached to the second input shaft 59*c* and is rotated once is half of the feed amount in the axial direction of the cutter 52 and the shaft member 54 in a case where the forward and backward moving operation handle 56*a* is attached to the first input shaft 59*b* and is rotated once.

In addition, the forward and backward moving operation handle 56*a* is attached to the first input shaft 59*b* or the second input shaft 59*c* and is rotatably operated, thereby the screw shaft 58 rotates, and the forward and backward moving case 57 and the drive mechanism 55 move forward and backward along with the cutter 52 and the shaft member 54. Therefore, the forward and backward moving case 57 abuts on the connection flange 53 (see the chain line portion of FIGS. 4 and 5), thereby capable of restricting movement of the cutter 52 and the shaft member 54.

Next, a boring process of the fluid pipe 1 by the boring machine 5 will be described.

Figure 6:
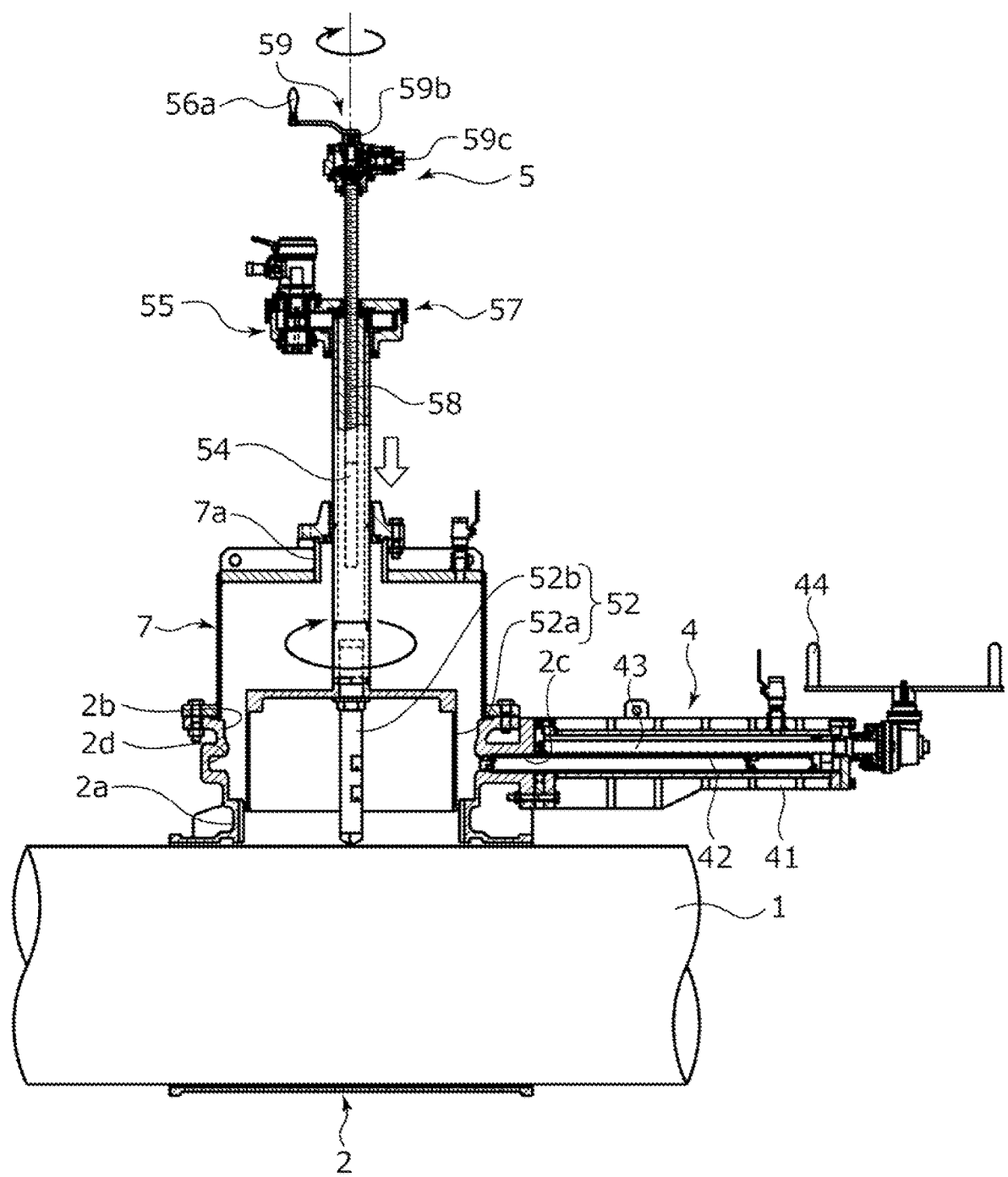
FIG. 6 is a sectional side view showing a state that, in a boring process of the fluid pipe by the boring machine, a center drill comes into contact with a peripheral wall portion of the fluid pipe.

Firstly, a drain hose and a chip recovery machine are connected to the drain piping. In this state, as shown in FIG. 6, the forward and backward moving operation handle 56*a* attached to the first input shaft 59*b* is manually rotatably operated to positively rotate the screw shaft 58, and thereby, in the branch portion 2*a* of the branching housing 2, moving forward the cutter 52 and the shaft member 54 to the side of the fluid pipe 1. A leading end of the center drill 52*b* comes into contact with a top portion of the peripheral wall portion of the fluid pipe 1, and once a change in resistance force transmitted to a hand via the forward and backward moving operation handle 56*a* is grasped, rotatable operation of the forward and backward moving operation handle 56*a* is stopped. In addition, after the fact that the leading end of the center drill 52*b* comes into contact with the top portion of the peripheral wall portion of the fluid pipe 1 is confirmed, by rotatably operating the forward and backward moving operation handle 56*a* so as to reversely rotate several times, the leading end of the center drill 52*b* may be moved slightly backward from the top portion of the peripheral wall portion of the fluid pipe 1.

Then, the hydraulic unit (not shown) and the rotary motor 55*a* are started, and the cutter 52 and the shaft member 54 are rotationally moved. At this time, the screw shaft 58 does not rotate under the influences of vibration transmitted from the drive mechanism 55, change in fluid pressure acting on the cutter 52 within the branch portion 2a, and the like, and therefore unexpected forward and backward movement of the cutter 52 and the shaft member 54 is prevented.

Figure 7:
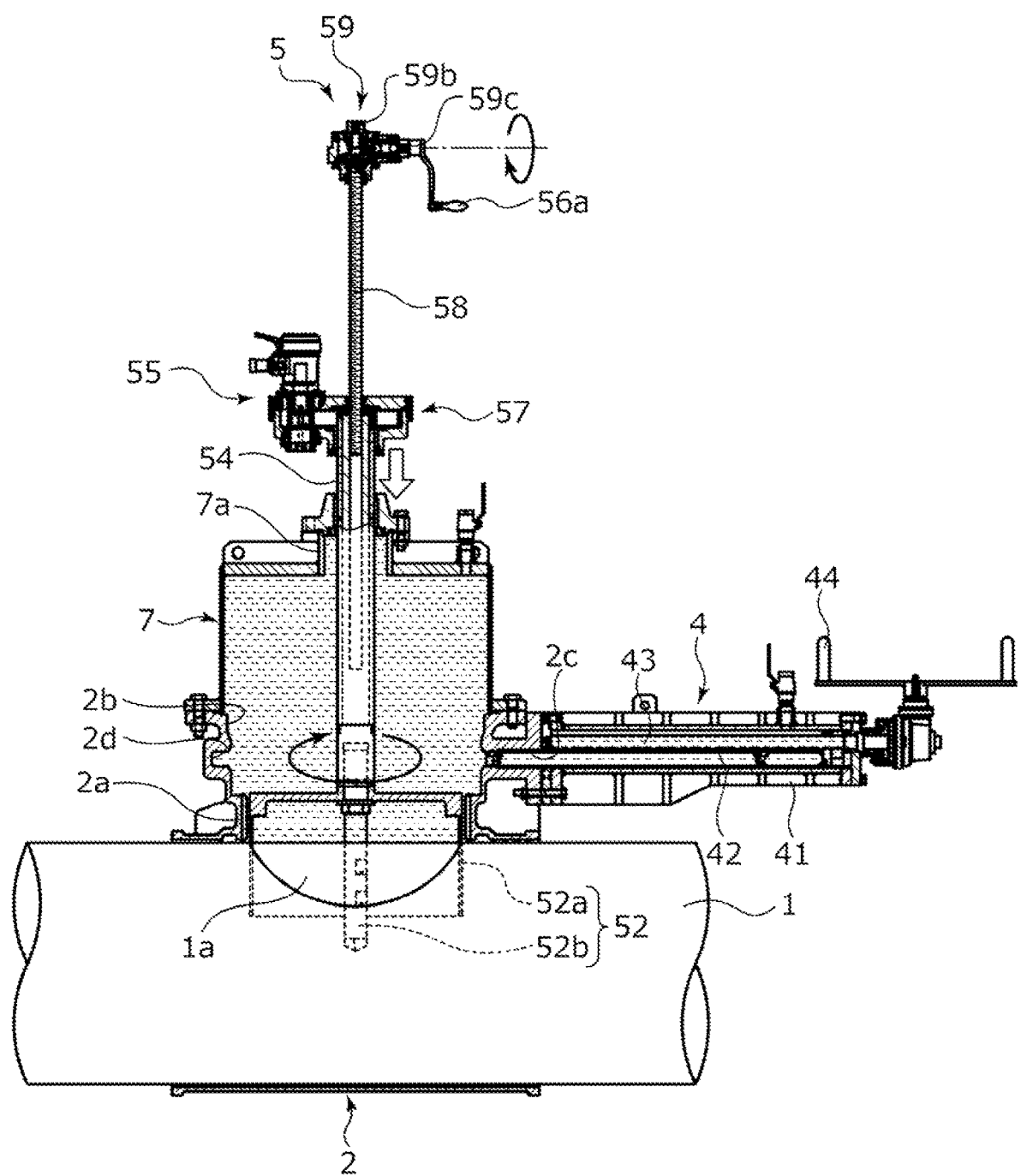
FIG. 7 is a sectional side view showing a state that, in the boring process of the fluid pipe by the boring machine, a cutting blade of a cutter cut the peripheral wall portion of the fluid pipe.

Next, as shown in FIG. 7, the forward and backward moving operation handle 56a is detached from the first input shaft 59b and attached to the second input shaft 59c. In addition, after attaching the forward and backward moving operation handle 56a to the second input shaft 59c, the hydraulic unit and the rotary motor 55a may be started, and the cutter 52 and the shaft member 54 may be rotationally moved. The forward and backward moving operation handle 56a attached to the second input shaft 59c is rotatably operated to positively rotate the screw shaft 58, and thereby, in the branch portion 2a of the branching housing 2, further moving forward the cutter 52 and the shaft member 54 to the side of the fluid pipe 1 to cut the fluid pipe 1. In addition, chips generated when the fluid pipe 1 is cut by the cutter 52 can be discharged together with fluid to the outside through the drain port (not shown) of the branching housing 2.

In this manner, by rotatably operating the forward and backward moving operation handle 56a attached to the second input shaft 59c, compared to the case where the forward and backward moving operation handle 56a attached to the first input shaft 59b is rotatably operated (see FIG. 6), the feed amount in the axial direction of the cutter 52 and the shaft member 54 becomes small, and therefore it is possible to slow down the proceeding speed of the cutter 52 and the shaft member 54.

In addition, resistance force transmitted to the hand of the operator via the forward and backward moving operation handle 56a is sequentially changed in a cutting process of the peripheral wall portion of the fluid pipe 1 by the cutter 52. Specifically, resistance force during the time when the center drill 52b proceeds while boring in the top portion of the peripheral wall portion of the fluid pipe 1 is small. When the cutter 52 proceeds, the cutting blade 52e of the cylindrical member 52a comes into contact with the peripheral wall portion of the fluid pipe 1, that is, two positions, which sandwich the center drill 52b, in the pipe axis direction of the peripheral wall portion of the fluid pipe 1, resistance force starts to be increased, and is changed according to the contact condition of the cutting blade 52e of the cylindrical member 52a and the peripheral wall portion of the fluid pipe 1 as the cutter 52 proceeds. Then, the cutting blade 52e of the cylindrical member 52a passes through the peripheral wall portion of the fluid pipe 1 over the entire circumference, thereby resistance force becomes small when a part of the peripheral wall portion of the fluid pipe 1 is cut.

In this manner, rotation of the forward and backward moving operation handle 56a is appropriately adjusted while grasping the change in resistance force transmitted to the hand via the forward and backward moving operation handle 56a, and the proceeding speed of the cutter 52 and the shaft member 54 is controlled, thereby a friction force generated between the cutter 52 and the peripheral wall portion of the fluid pipe 1 can be restrained from excessively increasing.

In addition, along with the rotatable operation of the forward and backward moving operation handle 56a, the rotating speed and torque of the cutter 52 and the shaft member 54 by the drive mechanism 55 is appropriately adjusted, and thereby a friction force generated between the cutter 52 and the peripheral wall portion of the fluid pipe 1 may be further restrained from excessively increasing. For example, the aforementioned hydraulic unit connected to the rotary motor 55a has a flow control unit and a pressure control unit for hydraulic oil, the operator operates these control units, and thereby the pressure and flow rate of the hydraulic oil supplied to the rotary motor 55a may be appropriately adjusted, that is, the rotating speed and torque of the shaft member 54 may be appropriately adjusted.

Moreover, the feed amount in the axial direction of the cutter 52 and the shaft member 54, from the position where the leading end of the center drill 52b comes into contact with the top portion of the peripheral wall portion of the fluid pipe 1, to the position where a part of the peripheral wall portion of the fluid pipe 1 is cut, and the boring condition of the fluid pipe 1 by the cutter 52 can be visually grasped from the outside of the branching housing 2 by a scale provided on the column 56c.

Figure 8:
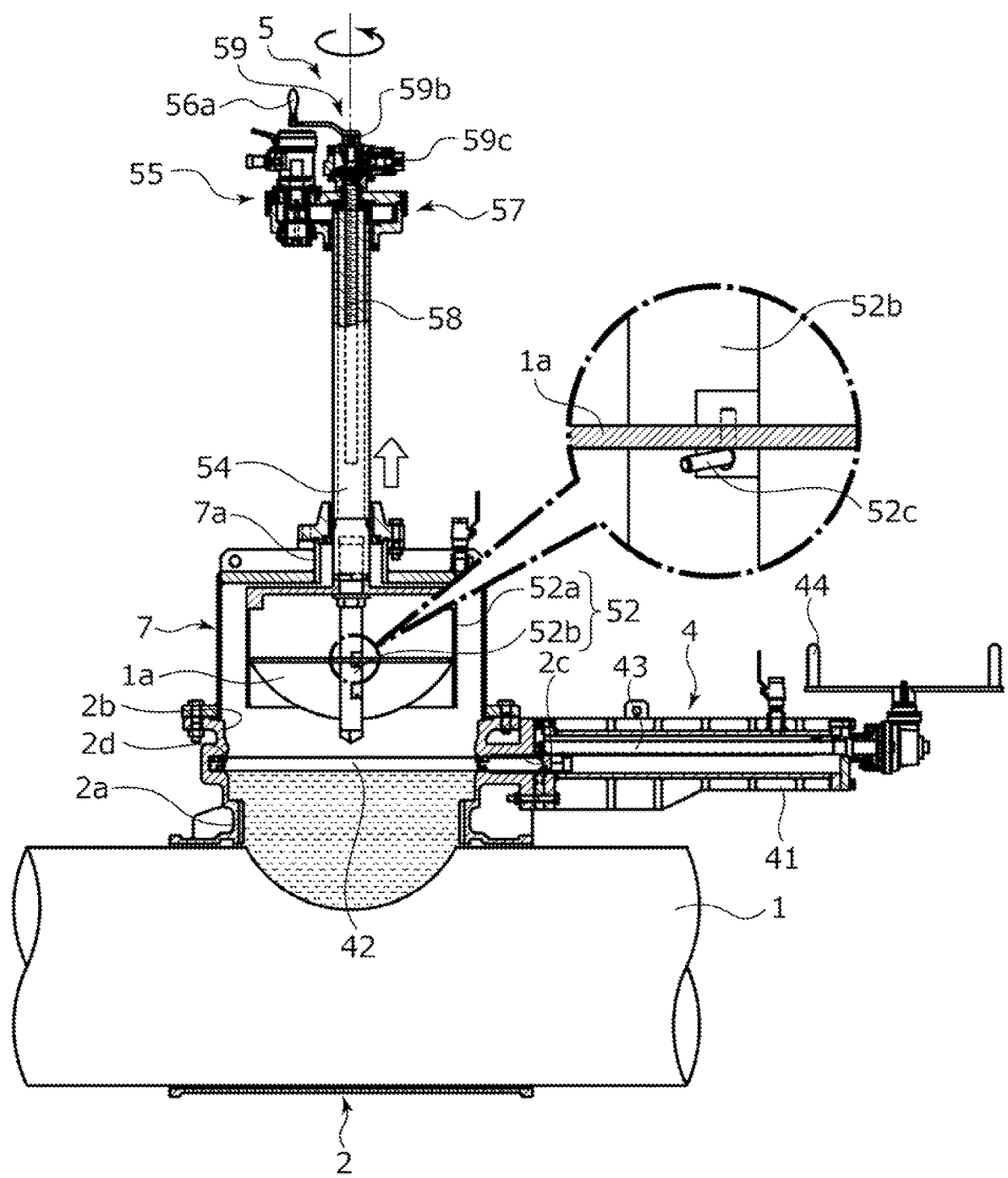
FIG. 8 is a sectional side view showing a state that, in the boring process of the fluid pipe by the boring machine, a piece of the cut fluid pipe is recovered.

Next, as shown in FIG. 8, the forward and backward moving operation handle 56a is detached from the second input shaft 59c and attached to the first input shaft 59b. The forward and backward moving operation handle 56a attached to the first input shaft 59b is rotatably operated to reversely rotate the screw shaft 58, and thereby, in the branch portion 2a of the branching housing 2, moving backward the cutter 52 and the shaft member 54.

At this time, as shown by a solid line in an area surrounded by a chain line of FIG. 8, the retainer 52c is expanded radially outside from an outer peripheral surface of the center drill 52b. Thereby, the piece 1a of the fluid pipe 1 cut by the cutter 52 is locked to the retainer 52c, and retained on the inner side of the cylindrical member 52a. In addition, during the time when the center drill 52b bores the peripheral wall portion of the fluid pipe 1, the retainer 52c is accommodated radially inside from the outer peripheral surface of the center drill 52b.

In this manner, by rotatably operating the forward and backward moving operation handle 56a attached to the first input shaft 59b, compared to the case where the forward and backward moving operation handle 56a attached to the second input shaft 59c is rotatably operated (see FIG. 7), the feed amount of the cutter 52 and the shaft member 54 becomes large, and therefore it is possible to make the proceeding speed of the cutter 52 and the shaft member 54 faster.

Finally, by rotatably operating the process valve handle 44 in the process valve 4 to positively rotate the valve rod 43, the process valve 4 moves forward the valve body 42 to the side of the branch portion 2a, seats it on the valve seat 2d, and blocks the inside of the branching housing 2.

In these ways, while keeping the uninterrupted flow state, a part of the peripheral wall portion of the fluid pipe 1 is cut, and it is possible to detach the boring machine 5 together with the attachment flange cylinder 7 from the branch portion 2a of the branching housing 2 and recover the piece 1a.

As described above, in the boring machine 5 of the present embodiment, by rotatably operating the forward and backward moving operation handle 56a attached to the first input shaft 59b in the forward and backward moving mechanism 56, the feed amount in the axial direction of the cutter 52 and the shaft member 54 becomes large, and the proceeding speed of the cutter 52 and the shaft member 54 to approach to the fluid pipe 1 can be made faster. Moreover, by rotatably operating the forward and backward moving operation handle 56a attached to the second input shaft 59c, the feed amount in the axial direction of the cutter 52 and the shaft member 54 becomes small, and the proceeding speed of the cutter 52 and the shaft member 54 in the cutting process of the peripheral wall portion of the fluid pipe 1 can be made slower. That is, the boring machine 5 is capable of switching the feed amount in the axial direction of the cutter 52 and the shaft member 54 into anyone of two different feed amounts according to the rotational amount of the forward and backward moving operation handle 56a, and is capable of easily controlling the proceeding speed of the cutter 52 by manual rotatable operation of the forward and backward moving operation handle 56a. Therefore, in the cutting process of the peripheral wall portion of the fluid pipe 1, a friction force generated between the cutter 52, especially the cutting blade 52e of the cylindrical member 52a and the peripheral wall portion of the fluid pipe 1 is restrained from excessively increasing, and it is possible to prevent wear and breakage of the cutter 52.

Moreover, the cutter 52 includes the center drill 52b projecting in the moving forward direction. Thereby, once the fact that the center drill 52b comes into contact with the top portion of the peripheral wall portion of the fluid pipe 1 is grasped, the feed amount in the axial direction of the cutter 52 and the shaft member 54 can be switched so as to become small.

Moreover, the center drill 52b passes through the peripheral wall portion of the fluid pipe 1, thereby capable of cutting the peripheral wall portion of the fluid pipe 1 in a state that the position of the cutting blade 52e of the cylindrical member 52a relative to the fluid pipe 1 is stabilized.

Moreover, the center drill 52b includes the retainer 52c which recovers the piece 1a of the cut fluid pipe 1. Thereby, after cutting a part of the peripheral wall portion of the fluid pipe 1, by attaching the forward and backward moving operation handle 56a to the first input shaft 59b and switching the feed amount in the axial direction of the cutter 52 and the shaft member 54 by rotatable operation of the forward and backward moving operation handle 56a so as to become large, it is possible to recover the piece 1a of the fluid pipe 1 retained by the retainer 52c in a short time.

Moreover, the forward and backward moving mechanism 56 includes the first input shaft 59b and the second input shaft 59c providing the different feed amounts in the axial direction by one revolution of the forward and backward moving operation handle 56a. Thereby, by respectively rotatably operating the forward and backward moving operation handle 56a attached to the first input shaft 59b or the second input shaft 59c, it is possible to switch the feed amount in the axial direction of the cutter 52 and the shaft member 54. That is, switching of the feed amount in the axial direction of the cutter 52 and the shaft member 54 by the forward and backward moving mechanism 56 can be realized by means of a simple structure.

Moreover, the forward and backward moving operation handle 56a is capable of attaching to and detaching from the first input shaft 59b and the second input shaft 59c, thereby one forward and backward moving operation handle 56a can be connected to a plurality of input shafts, and therefore the boring machine 5 can be compactly configured. Moreover, by detaching the forward and backward moving operation handle 56a from an unused input shaft, it is possible to avoid interference by rotational movement of the unused input shaft at the time of manual rotatable operation of the forward and backward moving operation handle 56a.

Moreover, since the outer peripheries of the first input shaft 59b and the second input shaft 59c are respectively surrounded by the cover members 59e, 59f over a circumferential direction, at the time of rotatable operation of the forward and backward moving operation handle 56a, an accident due to contact with or roll in the unused input shaft to which the forward and backward moving operation handle 56a is not attached can be prevented.

Although the embodiment according to the present invention has been described above with reference to the drawings, the specific configuration is not limited to the embodiment, and any changes or additions within the scope of the present invention are included in the present invention.

For example, in the embodiment described above, the mode in which, by contact of the leading end of the center drill 52b with the top portion of the peripheral wall portion of the fluid pipe 1, the feed amount in the axial direction of the cutter 52 and the shaft member 54 by rotatable operation of the forward and backward moving operation handle 56a is switched has been described, but the present invention is not limited to this. The center drill 52b proceeds while boring in the top portion of the peripheral wall portion of the fluid pipe 1, and the cutting blade 52e of the cylindrical member 52a comes into contact with the peripheral wall portion of the fluid pipe 1, thereby the feed amount in the axial direction of the cutter 52 and the shaft member 54 may be switched once the resistance force transmitted to the hand via the forward and backward moving operation handle 56a is increased.

Moreover, by grasping relative position between the cutter 52 and the peripheral wall portion of the fluid pipe 1 based on the scale provided on the column 56c, the feed amount in the axial direction of the cutter 52 and the shaft member 54 may be switched once the cutter 52 comes close to the top portion of the peripheral wall portion of the fluid pipe 1.

Moreover, in the embodiment described above, the mode in which the boring machine 5 is capable of switching the feed amount in the axial direction of the cutter 52 and the shaft member 54 by rotatable operation of the forward and backward moving operation handle 56a into anyone of two different feed amounts has been described, but the present invention is not limited to this. The boring machine may be capable of switching the feed amount into three or more different feed amounts.

Moreover, in the embodiment described above, the number of teeth of the second gear 59h fixed to the second input shaft 59c is half of the number of teeth of the first gear 59g fixed to the first input shaft 59b, that is, the feed amount in the axial direction of the cutter 52 and the shaft member 54 by rotatable operation of the forward and backward moving operation handle 56a attached to the second input shaft 59c is half of the feed amount in the axial direction of the cutter 52 and the shaft member 54 by rotatable operation of the forward and backward moving operation handle 56a attached to the first input shaft 59b, but the present invention is not limited to this. By changing the number of the teeth of the respective gears, a reduction ratio by switching of the feed amount in the axial direction of the cutter 52 and the shaft member 54 may be, for example, ⅓ or ¼.

Moreover, in the embodiment described above, the mode in which, by changing the input shaft which is rotatably operated by the forward and backward moving operation handle 56a, the feed amount in the axial direction of the cutter 52 and the shaft member 54 is switched has been described, but the present invention is not limited to this. The forward and backward moving operation handle may be fixedly attached to one input shaft, and a forward and backward moving operation means may be capable of switching the type of the gear circumscribing the gear fixed to the input shaft, thereby capable of switching the feed amount in the axial direction of the cutter 52 and the shaft member 54.

Moreover, in the embodiment described above, the case where the boring machine 5 having the cutter 52 cuts at least a part of the peripheral wall portion of the fluid pipe 1 has been illustratively described, but the present invention is not limited to this. A part of the fluid pipe 1 may be cut over the circumferential direction.

Moreover, the cutter 52 may be comprised solely of the cylindrical member 52a, without a center drill.

REFERENCE SIGNS LIST

1 Fluid pipe
1a Piece
2 Branching housing
4 Process valve
5 Boring machine
7 Attachment flange cylinder
52 Cutter
52a Cylindrical member
52b Center drill
52c Retainer (Recovery means)
53 Connection flange
54 Shaft member
55 Drive mechanism (Drive means)
56 Forward and backward moving mechanism (Forward and backward moving operation means)
56a Forward and backward moving operation handle (Handle)
57 Forward and backward moving case
58 Screw shaft
59 Operation box
59b First input shaft
59c Second input shaft
59e, 59f Cover member
59g First gear
59h Second gear

The invention claimed is:

1. A boring machine for boring a part of a fluid pipe in an uninterrupted flow state, comprising:
   a shaft member having a leading end to which a cutter is attached;
   a drive mechanism configured to rotate the cutter and the shaft member around an axis of the shaft member; and
   a forward and backward moving handle configured to move the cutter and the shaft member forward and backward in an axial direction of the shaft member by a handle that is manually rotated, wherein:
   the forward and backward moving handle is further configured to switch a feed amount of the cutter and the shaft member in the axial direction between at least two different feed amounts according to a rotational amount of the handle, wherein the forward and backward moving handle includes at least a first input shaft and a second input shaft providing the feed amounts in the axial direction, respectively, and the feed amounts are different from each other by one revolution of the handle.

2. The boring machine according to claim 1, wherein the cutter includes a center drill projecting in a forward moving direction of the cutter.

3. The boring machine according to claim 2, wherein the center drill includes a retainer which is configured to recover a piece of a cut fluid pipe.

4. The boring machine according to claim 1, wherein the handle is attachable to and detachable from the first input shaft and the second input shaft.

5. The boring machine according to claim 1, wherein further comprising cover members surrounding outer peripheries of the first input shaft and the second input shaft over a circumferential direction, respectively.

* * * * *